United States Patent
Sarmavuori

(10) Patent No.: US 7,864,868 B2
(45) Date of Patent: Jan. 4, 2011

(54) METHOD FOR DETECTING AN OCTET SLIP

(75) Inventor: Juha Sarmavuori, Espoo (FI)

(73) Assignee: Nokia Siemens Networks Oy, Espoo (FI)

( * ) Notice: Subject to any disclaimer, the term of this patent is extended or adjusted under 35 U.S.C. 154(b) by 1133 days.

(21) Appl. No.: 10/662,122

(22) Filed: Sep. 15, 2003

(65) Prior Publication Data

US 2004/0208248 A1 Oct. 21, 2004

Related U.S. Application Data

(60) Provisional application No. 60/464,113, filed on Apr. 21, 2003.

(51) Int. Cl.
*H04B 14/04* (2006.01)

(52) U.S. Cl. .................. 375/242; 375/226; 375/240.27; 375/243; 714/48; 714/699; 714/704; 714/746; 714/788; 714/799

(58) Field of Classification Search .................. 375/242, 375/354, 357, 364, 368, 370, 226, 240.27, 375/243; 714/48, 699, 704, 746, 788, 799
See application file for complete search history.

(56) References Cited

U.S. PATENT DOCUMENTS

| | | | | |
|---|---|---|---|---|
| 3,839,599 A | * | 10/1974 | Pitroda ........................ 375/371 |
| 4,833,675 A | * | 5/1989 | Hekimian et al. ........... 370/506 |
| 5,050,171 A | * | 9/1991 | Ishijima ....................... 714/798 |
| 5,282,211 A | * | 1/1994 | Manlick et al. .............. 714/707 |
| 5,745,510 A | * | 4/1998 | Choi ............................ 714/798 |
| 5,933,468 A | * | 8/1999 | Kingdon ...................... 375/362 |
| 6,081,570 A | * | 6/2000 | Ghuman et al. ............. 375/368 |
| 6,487,198 B1 | * | 11/2002 | Pierson, Jr. .................. 370/356 |
| 6,782,033 B2 | * | 8/2004 | Ozasa ......................... 372/108 |
| 2001/0019958 A1 | * | 9/2001 | Delfs et al. ................. 455/445 |

* cited by examiner

*Primary Examiner*—Mohammad H Ghayour
*Assistant Examiner*—Leila Malek
(74) *Attorney, Agent, or Firm*—Squire, Sanders & Dempsey, LLP

(57) ABSTRACT

An efficient method and system for detecting frame slip in an inband signalling block in pulse code modulation. The effect of frame slip on the inband signalling block is that the bits following the frame slip are transferred from the signalling block into an adjacent block. The octet slip is detected by searching an error bit in a signalling block by comparing it to a sample block. If an error bit is found, an error count for the adjacent block starting from the error bit is calculated. If the error count is more than one, a second error bit of the signalling block is searched (26) and bits of the adjacent block after second error bit are verified (27). If bits of the adjacent block after the second error bit are not correct, the octet slip cannot be assumed (29). Otherwise the octet slip can be assumed by analyzing error count and error bits.

26 Claims, 4 Drawing Sheets

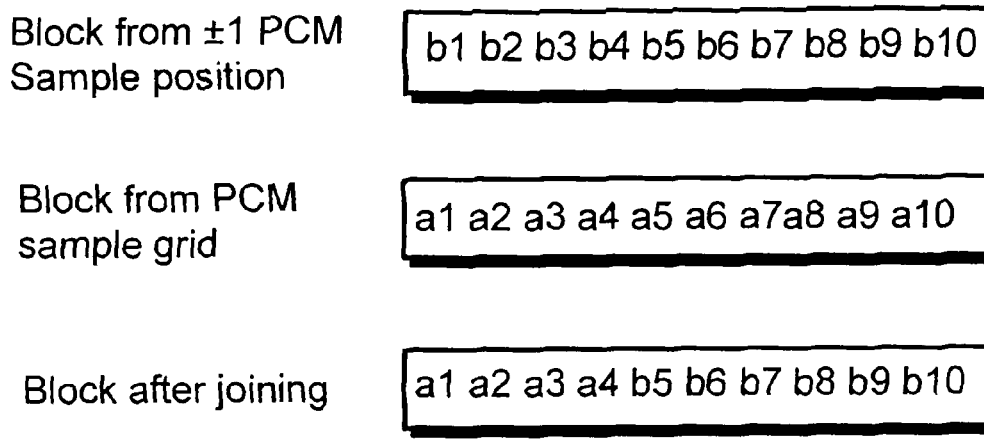
Fig. 1 *Prior Art*
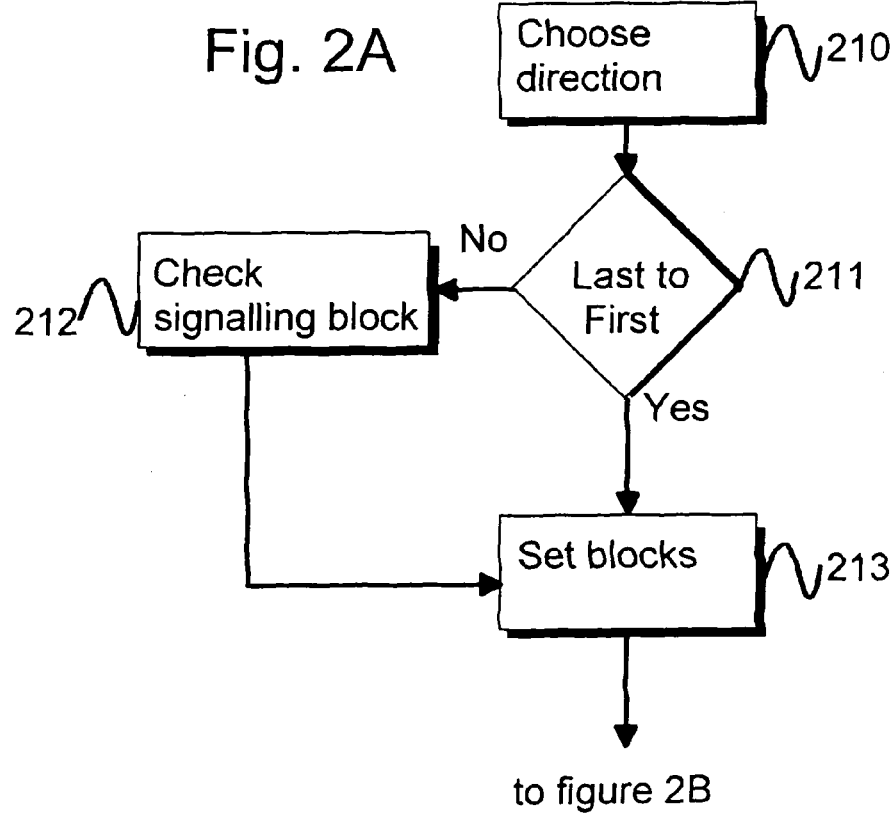
Fig. 2A

METHOD FOR DETECTING AN OCTET SLIP

CROSS REFERENCE TO RELATED APPLICATIONS

This application claims priority of U.S. Provisional Patent Application Ser. No. 60/464,113, entitled "Method for Detecting an Octet Slip," filed on Apr. 21, 2003, the contents of which are hereby incorporated by reference.

BACKGROUND OF THE INVENTION

1. Field of the Invention

The invention relates to pulse code modulation in telecommunication systems. In particular the present invention concerns a method for detecting a frame slip.

2. Description of the Related Art

In general, core networks of modern telecommunication systems are digital. However, the last mile connection is typically an analog twisted-pair cable. In a pair cable the received and sent signal is transmitted in the cable simultaneously. Thus cable resources are saved compared to a four lead cable. As the fixed line terminals are typically analog terminals, a signal conversion from analog to digital and vice versa is required.

PCM (Pulse Code Modulation) is a digital scheme for transmitting analog data. The PCM-signals are binary, that is, there are only two possible states, represented by logic 1 (high) and logic 0 (low). This is true no matter how complex the analog waveform happens to be. Using PCM, it is possible to digitize all forms of analog data, including full-motion video, voices, music, telemetry, and virtual reality.

To obtain PCM from an analog waveform at the source (transmitter end) of a communications circuit, the analog signal amplitude is sampled (e.g., measured) at regular time intervals. The sampling rate, or number of samples per second, is several times the maximum frequency of the analog waveform in cycles per second or hertz. The instantaneous amplitude of the analog signal at each sampling is rounded off to the nearest of several specific, predetermined levels. This process is called quantization. The number of levels is always a power of 2, for example, 8, 16, 32, or 64. These numbers can be represented by three, four, five, or six binary digits (bits) respectively. The output of a pulse code modulator is thus a series of digital samples that are binary numbers, each having some power of 2 possible different values.

At the destination (receiver end) of the communications circuit, a pulse code demodulator converts the digital samples back into pulses having the same quantum levels as those in the modulator. These pulses are further processed to restore the original analog waveform. If the sampling rates of the modulator and demodulator are not exactly the same, eventually the demodulator is going to receive some digital sample earlier or later than it is expecting. This is called frame slip. As a result of a frame slip one digital sample in the series of samples is lost (negative slip) or one sample is repeated twice in (positive slip). The effect on the analog waveform is as if the frequency of the analog waveform changed momentarily by relatively small value.

In a telecommunication network there are several pieces of equipment located between the modulator and demodulator in the transmission path of the pulse code modulated signal. Each of these pieces of equipment may have different clock rate. In order to minimize the effect on the analog waveform unsynchronized digital signal processing equipment occasionally has to duplicate or delete one digital sample. As a result pulse code modulated signals in telecommunication networks have frame slips.

ETSI TS 101 504 V8.0.1 (2000-08) standard, which is included here by reference, describes an inband signalling protocol between transcoder and rate adapter units for speech traffic channels in tandem free operation of speech codecs. In this protocol communications are handled with inband signalling messages. Inband signalling messages are transmitted by replacing the least significant bit of some of the digital samples by a bit of inband signalling message. In the standard, digital samples are called octets because they consists of 8 bits and the interval in which the least significant bit of octet is replaced is defined to be 16 samples. Generally similar inband signalling can be carried in the least significant bit of every Nth digital sample and digital sample can be some other number of bits than 8. Furthermore the standard defines inband signalling messages to be constructed of 20 and 10 bit long blocks. Generally N bit long mocks can be considered.

The standard discloses several error detecting and correcting situations based on the limited number of allowed 20 or 10 bit blocks among all possibilities of 20 or 10 bit blocks. The standard suggests assuming hypothetical octet slip for finding error-free or single-error message. An octet slip is a situation in which sequence of octets has slipped one octet forward or backward. As a result a block of inband signalling bits taken from least significant bit of every $16^{th}$ octet contains only the first part of the intended 20 or 10 bits. Bits that arrive after the octet slip have shifted into an adjacent block can be found in the least significant bit of every preceding or succeeding $16^{th}$ octet. If an error-free or a single-error inband signalling message can be found after considering a hypothetical octet slip ($\pm 1$ octet), then it may be regarded as error-free or single-error and the new phase position will be regarded as valid provided that no valid or present inband signalling message can be found at the old phase position. However, even though the standard suggests assuming the octet slip, it does not provide any means for detecting an octet slip within inband signalling block.

One solution for detecting an octet slip is to take first k bit of the inband signalling message block from found PCM sample grid and 20-k or 10-k last bits from the $\pm 1$ position and join the k bit field with 20-k or 10-k bit field to form the octet slipped block and calculate the number of error bits. Because the time of the octet slip is not known beforehand in the worst case this has to be repeated for all values of k=1 . . . 20 or 10 until right value of k is found. FIG. 1 illustrates an example situation where k=4. Bits a are the least significant bits of previously found 16 octet grid. Bits b are the least significant bits of preceding or succeeding 16 octet grid. Normally the 10 bit block of inband signalling message should consist of the a bits. However because of an octet slip somewhere between bits 4 and 5 the last bits of block appear in b bits instead. A device that is supposed to interpret inband signalling messages does not know in advance at which point the octet slip has occurred. Therefore it has to try to match different combinations of a and b bits with acceptable bit patterns before it finds out, for example, that a combination of the first 4 a bits and 6 last b bits produces expected result. For N bit block there are N different possibilities where octet slip may have occurred. Therefore there are N different combinations of a and b bits. The investigation of whether a combination is right or not takes time proportional to N.

The drawback of the above-described solution is the $O(N^2)$ complexity. $O(N^2)$ complexity means that time required to compute the algorithm is related to the square of the input size. Thus there is obvious need for an efficient method for detecting an octet slip in an inband signalling block.

Accordingly, it would be desirable to have a more efficient method for detecting an octet slip in pulse code modulation in telecommunication systems.

SUMMARY OF THE INVENTION

The invention discloses improved methods for detecting an assumed octet slip in an inband signalling block in pulse code modulation. Octet slip is assumed for detecting possible phase shift. In one aspect of the invention, octet slip is detected by processing two different bit blocks that are collected from the least significant bit of every $16^{th}$ octet. The block that would usually, under errorless circumstances in case of no octet slip, correspond to the sample block that is expected to be found, is referred as a signalling block. The block where expected bits have transferred into after the octet slip is referred as an adjacent block.

The adjacent block includes bits that are collected from the least significant bit of every octet before or after the octet which carries the bit of the signalling block. When negative octet slip is searched the adjacent block contains the bits from the predecessor octets of the octets occupied by signalling block. When positive octet slip is searched the adjacent block contains the bits from the successor octets. Accordingly, one embodiment of a method of the invention includes searching error bits in the signalling block and counting error bits of the adjacent block.

The octet slip is observed by analyzing error count and searched error bits. Searching the error bit is done by comparing the signalling block to a sample block. The error count for adjacent block is started from the first error bit k1 of signalling block. If error count of adjacent block is zero or one, the octet slip may have happened before error bit k1. If error count is more than one the octet slip may have happened from or after the error bit k 1. If the error count is more than one, a second error bit k2 of signalling block is searched starting from bit k1+1 When second error bit k2 is found, the bits of the adjacent block starting from the second error bit k2 are verified. If the bits starting from k2 are correct, the octet slip is between error bits k 1 and k2 and the error count is one. Otherwise the error count is more than one and octet slip cannot be detected.

One benefit of the present invention is the efficiency compared to 6(N^2) complexity of the prior solution. Furthermore a benefit of the invention is that it can be easily implemented as present digital signal processors include capabilities for comparing and searching the first error bit.

BRIEF DESCRIPTION OF THE DRAWINGS

The accompanying drawings, which are included to provide a further understanding of the invention and constitute a part of this specification, illustrate example embodiments of the invention and together with the description help to explain the principles of the invention. In the drawings:

FIG. 1 is a prior art illustration of one step in an obvious solution for detecting an octet slip;

FIG. 2A is a flow chart of an example embodiment of the present invention;

DETAILED DESCRIPTION OF THE PREFERRED EMBODIMENT(S)

Reference will now be made in detail to the embodiments of the present invention, examples of which are illustrated in the accompanying drawings.

Figure 2B:
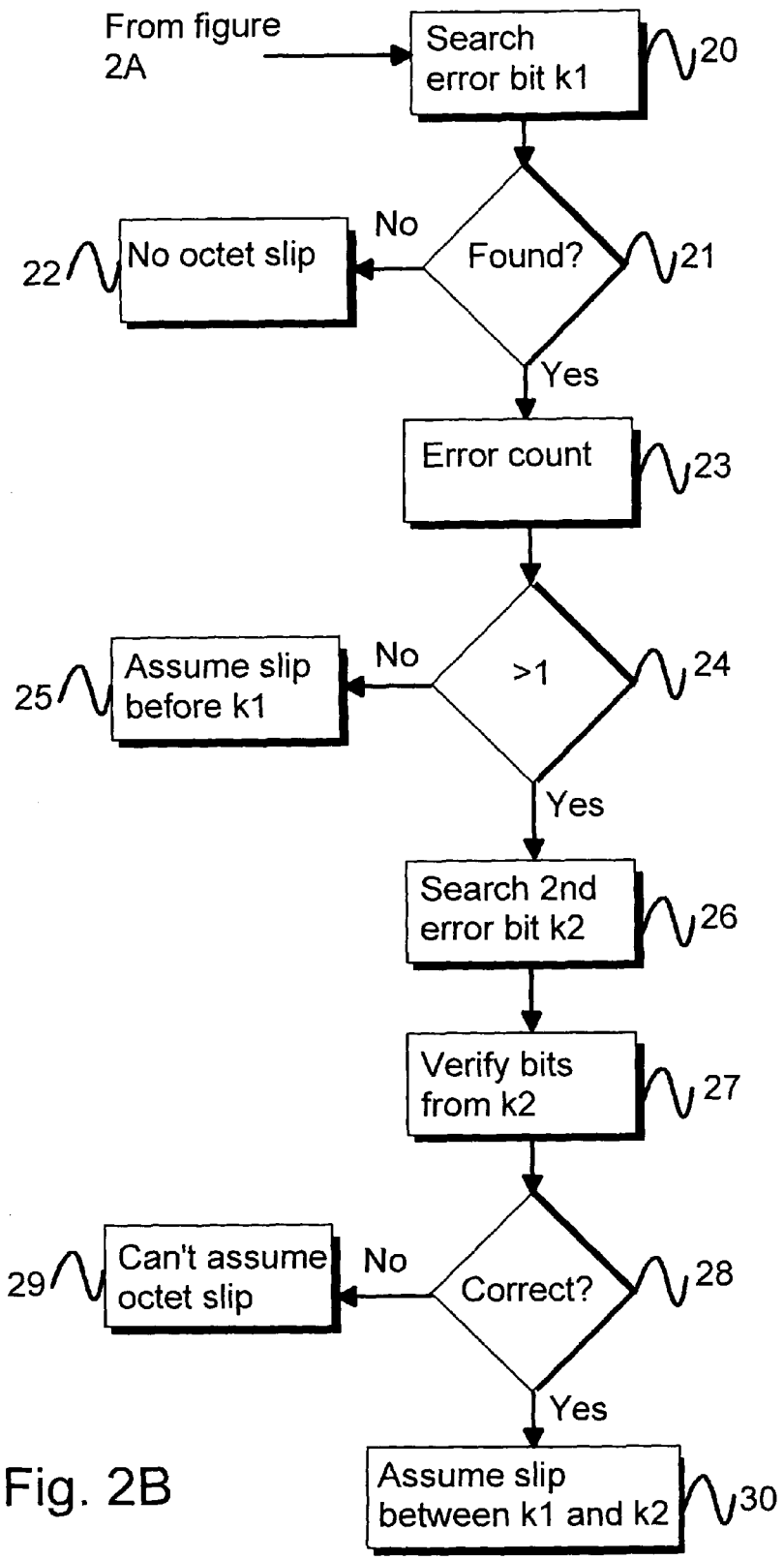
FIG. 2B is a flow chart of an example embodiment of the present invention.

In FIGS. 2A and 2B a flow chart of a method according to one aspect of the present invention is represented. A method for detecting an octet slip in an inband signalling block in pulse code modulation includes searching and counting error bits from the signalling block and adjacent block. FIG. 2A represents an optional part of the present invention that is not required in the preferred embodiment. The method starts by choosing the searching direction in step 210. If searching is decided to start from the last bit in step 211, the signalling block is checked first to see if it is completely error free in step 212. After checking, the blocks are set in step 213. If the searching is started from the last bit to the first bit the error bits are counted from the signalling block. If the searching is started from the first bit the error bits are counted from the adjacent block. In one preferred embodiment the search is started always from the first bit.

The octet slip is observed by analyzing error count and searched error bits. Searching of the error bits is done by comparing the signalling block to a sample block, step 20. If no error bits are found in said searching, the block was correct and no further actions are needed, steps 21 and 22. Searching can be made for example by performing XOR-operation to signalling block with sample block so that in a result the correct bits are zeros and the erroneous bits are set to ones. The set error bits can be easily detected by hardware. Complexity of searching the first error bit is proportional to the amount of the bits before k1.

If an error bit is found, the following step is to count the amount of errors in the adjacent block starting from the bit after k1 in step 23. Again error bits can be set to one by a XOR-operation of adjacent block with sample block. The error count is simply the sum of 1 bits. Because upper limit for error is known to be 1 counting of all bits is not necessary. Counting can be stopped when an error count of 1 has been reached. Complexity of counting is proportional to N-k1, in which N is the amount of the bits in the signalling block. If the error count is zero or one, step 24, the octet slip may have happened before error bit k1, step 25. If the error count is more than one the octet slip may have happened from or after the error bit k1 and second error bit k2 is searched in step 26. The complexity of searching the second bit is proportional to k2-k1. The error bit k2 is searched starting from bit k1+1. When second error bit k2 is found in step 26 the bits of the adjacent block starting from the second error bit k2+1 are verified in step 27. The complexity of verifying is proportional to N-k2. If the bits of the adjacent block starting from k2 are correct in step 28, the octet slip is assumed between error bits k1 and k2 and the error count is one in step 30. Otherwise the error count is more than one and octet slip can not be assumed in step 29. As the method does not have internal loops the overall time needed for computations in a worst case is proportional to k1+(N-k1)+(k2k1)+(N-k2). Thus the method is considered to be very efficient.

Figure 3:
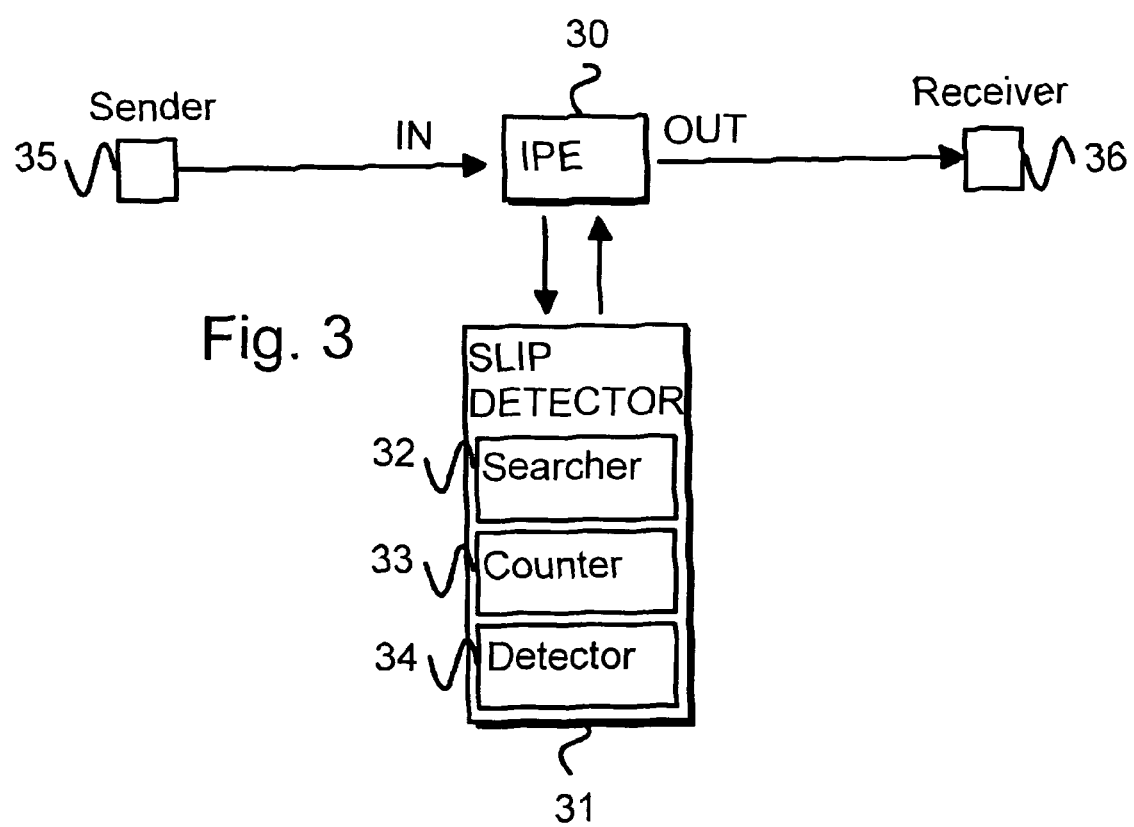
FIG. 3 is a block diagram illustrating one embodiment of a system according to the present invention.

In FIG. 3 an embodiment of the present invention is represented. Advantageously the invention is implemented with in the IPE (In Path Equipment) 30. IPE is arranged between the sender 35 and receiver 36. Types of the IPE are discussed in annex B.1 of the ETSI TS 101 504 V8.0.1 (2000-08) standard.

Typical IPE is a switch, a link or a DTMF (Dual Tone Multi Frequency) generator. The octet slip assuming can be done with a separate module or an integrated module. In FIG. 3 the slip detector module 31 is separate. The slip detector module 31 is utilized when regular error detection of IPE 30 fails. This means a phase shift in a block so that there seems to be several bit errors even if in reality the only error is a phase shift of one PCM sample. Therefore a hypothetical octet slip is assumed.

A system for detecting an assumed octet slip in one embodiment includes the sender terminal 35, the receiver terminal 36 and the in path equipment 30. The octet slip is detected by a slip detector 31. In the preferred embodiment the slip detector is arranged into IPE 30. The slip detector 31 comprises three components that are a searcher 32, a counter 33 and a detector 34. The searcher 32 first searches first error bit k1 starting from the first bit of the signalling block. The searcher 32 searches bit error by comparing the signalling block to a sample block. The counter 33 is arranged to count the number of bit errors starting from said k1 bit in the adjacent block. The detector 34 is arranged to detect the octet slip by analyzing error bits in the adjacent block. The detector 34 detects the octet slip starting from or after the bit k1 if the number of the bit errors in the adjacent block is more than one. If the error count starting from the k1 is zero or one the octet slip is detected before the bit k1. If error count is more than one, the searcher 32 searches second error bit k2 starting from the bit after the first error bit k1. If the second error bit is found, the detector 34 verifies if the bits of the adjacent block starting from the second error bit k2 are correct. If the bits are correct, the octet slip is detected between error bits k1 and k2. If the error count is more than one, the detector 34 cannot observe the octet slip. The searcher 32, counter 33 and detector 34 can be implemented in software. The system may be arranged to work similarly as the method of FIG. 2. Thus the system is capable of choosing the searching direction if desired. The system presented in FIG. 3 is an example of a preferred embodiment which searches always from the first bit.

Figure 4:
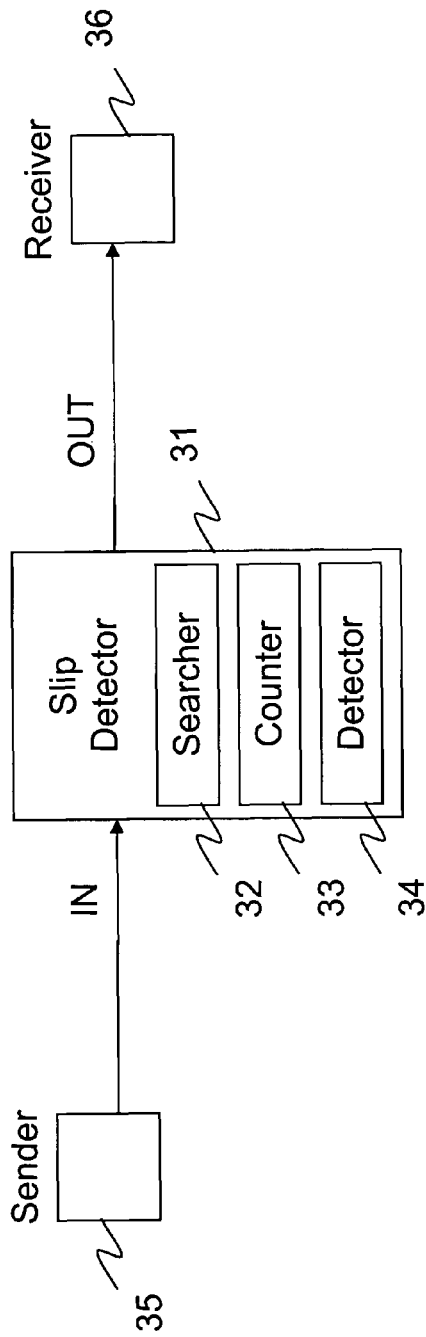
FIG. 4 is a block diagram illustrating one embodiment of a system according to the present invention.

In FIG. 4, an embodiment of the present invention is represented. The slip detector 31, as described above, may be arranged in the in path equipment 30.

Figure 5:
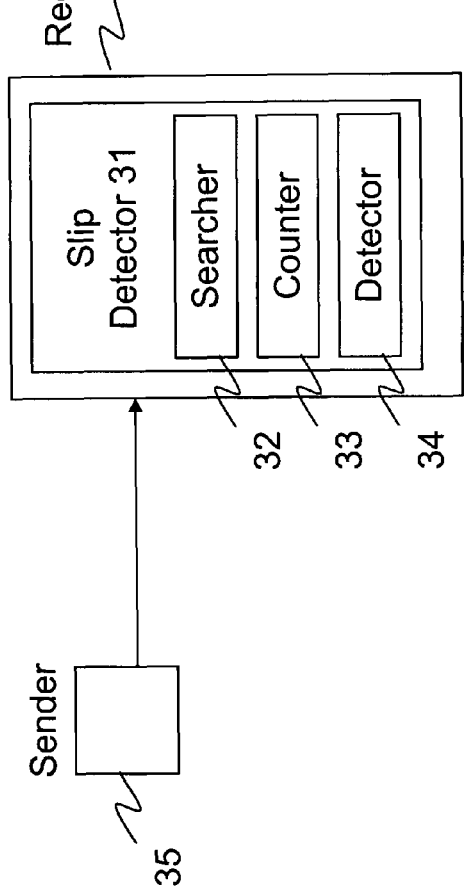
FIG. 5 is a block diagram illustrating one embodiment of a system according to the present invention.

In FIG. 5, an embodiment of the present invention is represented. The slip detector 31, as described above, may be arranged in the receiver terminal 36.

It should be noted that the method and the system applying the method described above works to both directions. This means that the first bit from where the searching is initiated may be the most significant or the least significant bit. If searching is initiated from the last bit, the search is initiated from the adjacent block and the errors are counted from the signaling block. In this case it is best to check if the signaling block is error free. The algorithm works correctly in both cases. The method may be applied also in the terminal devices described by the above-mentioned ETSI standard chapter 8.4.2.

It is apparent to a person skilled in the art that with the advancement of technology, the basic idea of the invention may be implemented in various ways. The invention and its embodiments are thus not limited to the examples described above but instead is limited only by the scope of the claims.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions could be made, while remaining within the spirit and scope of the invention.

I claim:

1. A method for detecting an octet slip in an inband signalling block in pulse code modulation, the method comprising:
    searching, with a searcher, for a first error bit to identify a first error position starting from an end of a searching block, the searching block comprising a set of bits;
    counting, with a counter, a number of bit errors starting from a position in an adjacent block corresponding to the first error bit position to determine whether there is an octet slip before the first error position, the adjacent block being a set of bits where each bit is present in an octet which is adjacent to an octet containing a corresponding bit of the searching block;
    in the event that an octet slip before the first error position is not indicated, searching in the searching block for a second error bit to identify a second error position and detecting, with a detector, octet slip by verifying bits starting from a position in an adjacent block corresponding to the second error bit position;
    detecting if the bits of the adjacent block starting from the second error bit position are verified as being correct; and
    detecting that the octet slip is between the first and second error bit positions if the bits starting from the second error bit position are correct.

2. The method according to claim 1, wherein when the searching is carried out in a direction from a first bit to a last bit, the searching block is a signalling block.

3. The method according to claim 1, wherein when the searching is carried out in a direction from a last bit to a first bit, the searching block is an adjacent block with respect to a signalling block.

4. The method according to claim 1, wherein searching and counting bit errors is performed by comparing the searching block and the adjacent block to a sample block.

5. The method according to claim 1, wherein the octet slip is sought for starting from or after the first error bit position if the number of the bit errors in the adjacent block is more than one.

6. The method according to claim 1, wherein the octet slip is detected before the first error bit if the number of error bits starting from the first error bit position is zero or one.

7. The method according to claim 5, further comprising searching for the second error bit position of the searching block starting from a bit after the first error bit position.

8. The method according to the claim 1, further comprising determining that the octet slip cannot be detected if more than one erroneous bit not attributable to octet slip is found.

9. A device for detecting an octet slip in an inband signalling block in pulse code modulation comprising a slip detector, the device comprising:
    a searcher configured to search for a first error bit to identify a first error bit position starting from an end of a signalling block, the signalling block comprising a set of bits;
    a counter configured to count a number of bit errors starting from a position in an adjacent block corresponding to the first error bit position to determine whether there is an octet slip before the first error position, the adjacent block being another set of bits where each bit is present in an octet which is adjacent to an octet containing a corresponding bit of the searching block; and
    a detector configured to detect the octet slip by verifying error bits starting from a position in an adjacent block corresponding to a second error bit position of a second error bit in the signaling block in the event that an octet slip before the first error position is not indicated, detect if the bits of the adjacent block starting from the second error bit position are correct, and detect that the octet slip is between the first and second error bit positions if the bits starting from the second error bit are correct.

10. The device according to claim 9, wherein if the chosen direction is from a first bit to a last bit the device is configured to set the searching block to correspond to a signalling block.

11. The device according to claim 9, wherein if the chosen direction is from a last bit to a first bit the device is configured to set the searching block to correspond to an adjacent block with respect to a signalling block.

12. The device according to claim 10, wherein the searcher is configured to search bit error by comparing the signalling block and the adjacent block to a sample block.

13. The device according to claim 10, wherein the detector is configured to seek the octet slip starting from or after the first error bit position, if the number of bit errors in the slipped block is more than one.

14. The device according to claim 9, wherein the detector is configured to detect the octet slip before the first error bit position if the number of bit errors starting from the first error bit position is zero or one.

15. The device according to claim 13, wherein searcher is configured to search for the second error bit position of the searching block starting from a bit after the first error bit position.

16. The device according to the claim 9, wherein the detector is configured to determine that the octet slip cannot be detected if more than one erroneous bit not attributable to octet slip is found.

17. A system for detecting an octet slip in an inband signalling block in pulse code modulation, which system comprises:

a sender terminal configured to transmit a signal;

a receiver terminal;

an in path equipment; and a slip detector comprising a searcher configured to search for a first error bit to identify a first error bit position starting from an end of a signalling block, the signalling block comprising a set of bits, a counter configured to count a number of bit errors starting from a position in an adjacent block corresponding to the first error bit position, the adjacent block being another set of bits where each bit is present in an octet which is adjacent to an octet containing a corresponding bit of the searching block, and a detector configured to detect the octet slip by verifying bits starting from a position in an adjacent block corresponding to a second error bit position of a second error bit in the signalling block in the event that an octet slip before the first error position is not indicated, wherein the slip detector is configured to detect octet slip of the signal transmitted from the sender terminal through the in path equipment to the receiver terminal, in the event that octet slip has occurred in the signal such that the configuration of the slip detector is capable of detecting it, detect if the bits of the adjacent block starting from the second error bit position are verified as being correct, and detect that the octet slip is between the first and second error bit positions if the bits starting from the second error bit position are correct.

18. The system according to claim 17, wherein if the chosen direction is from a first bit to the last bit the device is configured to set the searching block to correspond to a signalling block.

19. The system according to claim 17, wherein if the chosen direction is from a last bit to a first bit the device is configured to set the searching block to correspond to an adjacent block with respect to a signalling block.

20. The system according to claim 18, wherein the searcher is configured to search bit error by comparing the signalling block and the adjacent block to a sample block.

21. The system according to claim 18, wherein the detector is arranged to seek the octet slip starting from or after the first error bit position, if the number of the bit errors in the slipped block is more than one.

22. The system according to claim 17, wherein the detector is configured to detect the octet slip before the first error bit position if the number of bit errors starting from the first error bit position is zero or one.

23. The system according to claim 21, wherein the searcher is configured to search for the second error bit position of the searching block starting from a bit after the first error bit position.

24. The system according to claim 17, wherein the detector is configured to determine that the octet slip cannot be detected is more than one erroneous bit not attributable to octet slip is found.

25. The system according to claim 17 wherein the slip detector is configured into the path equipment.

26. The system according to the claim 17, wherein the slip detector is configured into the receiver terminal.

* * * * *